(12) United States Patent
Douriet et al.

(10) Patent No.: US 7,376,914 B2
(45) Date of Patent: May 20, 2008

(54) METHOD AND COMPUTER PROGRAM PRODUCT FOR DESIGNING POWER DISTRIBUTION SYSTEM IN A CIRCUIT

(75) Inventors: Daniel Douriet, Round Rock, TX (US); Anand Haridass, Austin, TX (US); Andreas Huber, Austin, TX (US); Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 11/379,446

(22) Filed: Apr. 20, 2006

(65) Prior Publication Data

US 2007/0250796 A1 Oct. 25, 2007

(51) Int. Cl.
*G06F 17/50* (2006.01)
(52) U.S. Cl. ............................................. 716/1; 716/2
(58) Field of Classification Search .................... 716/1, 716/2, 15
See application file for complete search history.

(56) References Cited

U.S. PATENT DOCUMENTS 6,396,137 B1 * 5/2002 Klughart ..................... 257/691
6,557,154 B1 * 4/2003 Harada et al. ................ 716/11
6,986,117 B1 * 1/2006 Teig et al. ..................... 716/7

* cited by examiner

*Primary Examiner*—Jack Chiang
*Assistant Examiner*—Binh Tat
(74) *Attorney, Agent, or Firm*—Cantor Colburn LLP; Cas Salys

(57) ABSTRACT

A method for designing a power distribution system including: receiving a cross section file that contains the layout of a PCB including a location of one or more power sinks and sources on the PCB; creating an initial power distribution system; evaluating the initial power distribution system against a cost function; creating a new power distribution system; evaluating the new power distribution system against the cost function; determining if the cost function associated with the new power distribution system is equal to or greater than a stop criterion; and creating another new power distribution system if the cost function associated with the new power distribution system is greater than the stop criterion.

2 Claims, 3 Drawing Sheets

METHOD AND COMPUTER PROGRAM PRODUCT FOR DESIGNING POWER DISTRIBUTION SYSTEM IN A CIRCUIT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Technical Field

The present invention relates generally to electrical and electronic circuits and systems fabricated on printed wiring boards and more specifically to a method for power distribution layout in a circuit.

2. Description of the Related Art

Printed wiring boards (PWBs), also referred to as printed circuit boards (PCBs) have been in use for decades for fabricating circuits and entire systems. The PWBs provide the interconnects for discrete and integrated components and subsystems and provide power paths or power planes for interconnecting the components to power supplies.

Power distribution systems in PWBs have always been a concern and in particular, high current systems such as today's processing systems and interchangeable processing sub-units ("blades") require the handling of very high currents per PWB on some power supply connections, which can generate substantial voltage drops within the PWB conductor(s) and require multiple connector pins or other connector contacts connected in parallel to carry the amount of current supplied to a particular power supply distribution net.

To alleviate the voltage drop problem (and also provide electromagnetic shielding), processing systems and subsystems integrated on a PWB typically use specific layers of a multilayer PWB to carry the power supply voltages and returns or may include a few other connections, but will primarily be power supply layers. A layer dedicated to power supply distribution may actually include multiple power planes distributing two or more separate power supply outputs or may be dedicated to distributing a single power supply output.

The large metal areas typically used for power planes reduce the voltage drop to the connector pins or other terminals used to connect the PWB to a power supply. However, differential voltages exist between the power supply terminal connections, even with a continuous metal plane, because of differing resistive path lengths between the terminals and the current sinks or sources (e.g., a large current consumer such as a processor) and the individual terminals. Additionally, the current distribution in the power plane metal, which is not uniform, contributes to the differential voltages between the terminals, and the differential voltages cause non-uniform distribution of terminal currents. In general: 1) terminals that are closer to the current sources and sinks (i.e., the device power terminals) on the PWB carry more current due to the shorter paths; and 2) terminals that are toward the outside of the terminal array carry higher currents due to the decreased current density away from the center of the connector length (because of lowered voltage drop per unit length along the paths passing through lower current density regions). Both of the above-recited factors superimpose to yield a particular terminal current distribution for each power plane and for each PWB/terminal configuration.

In present-day systems, such as large scalable server systems operating at relatively low voltages, the current levels per PWB and per-terminal are very large. As such, a significant amount of power is dissipated in the connectors due to pin resistance and in the PWBs themselves due to the finite conductivity of the metal layers used to implement the power planes. The use of thin laminated PWBs having many layers also increases the effective resistance of the paths between devices on the PWB and the connector terminals, leading to an increase in the terminal current distribution described above.

The disparity in terminal currents leads to a need to over-specify a connector for pin current handling, which is typically set by the maximum power dissipation through the pin and the overall tolerable pin resistance (dictated by the maximum voltage drop(s) to the components on the PWB). Alternatively, an increase in the total number of terminals required to couple the power supply to the PWB power plane(s) is required.

Also, overall power dissipation is increased by a disparate terminal current distribution. Because the power dissipation per terminal (both in the power plane and the connector pin) is a function of the square of the current through the terminal, the average power dissipation in a connector is not constant over all the possible terminal current distributions, but is at a minimum when the terminal current distribution is equal. For example, for two terminals carrying a total of 4A, if the pin currents are equal, the power dissipation in watts is 8R where R is the resistance of the pins. If the pin currents are 1A and 3A respectively, the power dissipation in watts is 10R. Equalizing the terminal current distribution minimizes the power dissipation in the connector, as well as generally minimizing average power dissipation in the power plane metal area.

SUMMARY

The shortcomings of the prior art are overcome and additional advantages are provided through the provision of test generation methods.

Exemplary embodiments include a method for designing a power distribution system including: receiving a cross section file that contains the layout of a PCB including a location of one or more power sinks and sources on the PCB; creating an initial power distribution system; evaluating the initial power distribution system against a cost function; creating a new power distribution system; evaluating the new power distribution system against the cost function; determining if the cost function associated with the new power distribution system is equal to or greater than a stop criterion; and creating another new power distribution system if the cost function associated with the new power distribution system is greater than the stop criterion.

Exemplary embodiments also include a computer program product for designing a power distribution system, the computer program product including a storage medium readable by a processing circuit and storing instructions for execution by the processing circuit for facilitating a method including: receiving a cross section file that contains the layout of a PCB including a location of one or more power sinks and sources on the PCB; creating an initial power distribution system; evaluating the initial power distribution system against a cost function; creating a new power distribution system; evaluating the new power distribution system against the cost function; determining if the cost function associated with the new power distribution system is equal to or greater than a stop criterion; and creating another new power distribution system if the cost function associated with the new power distribution system is greater than the stop criterion.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that designs an efficient power distribution system for a PCB.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2(a)-(d) illustrate a series of PCB boards with varying power distribution systems.

The detailed description explains the preferred embodiments of the invention, together with advantages and features, by way of example with reference to the drawings.

DETAILED DESCRIPTION

In an exemplary embodiment a PCB design has a plurality of layers and one or more entire layer may be available for power distribution. Alternatively, a portion of one or more layers may be used for power distribution purposes. In either case, the power wiring is required for two or more power domains (e.g., a high and low voltage level). In exemplary embodiments, the GND net is treated as a separate domain. In an ideal power distribution system the power wiring is split between the different power domains such that voltage drop and power dissipation are minimized. Each PCB includes a plurality of power sinks and sources (e.g., locations of power supplies, chips, and other devices that draw power) that have fixed locations on the PCB. The arrangement of the layers of the PCB and the location of the sinks and sources on the PCB is described in a cross section file. In one embodiment, the cross section files also contain the shapes available for power distribution for each layer or portion of each layer that is available for power distribution.

Figure 1:
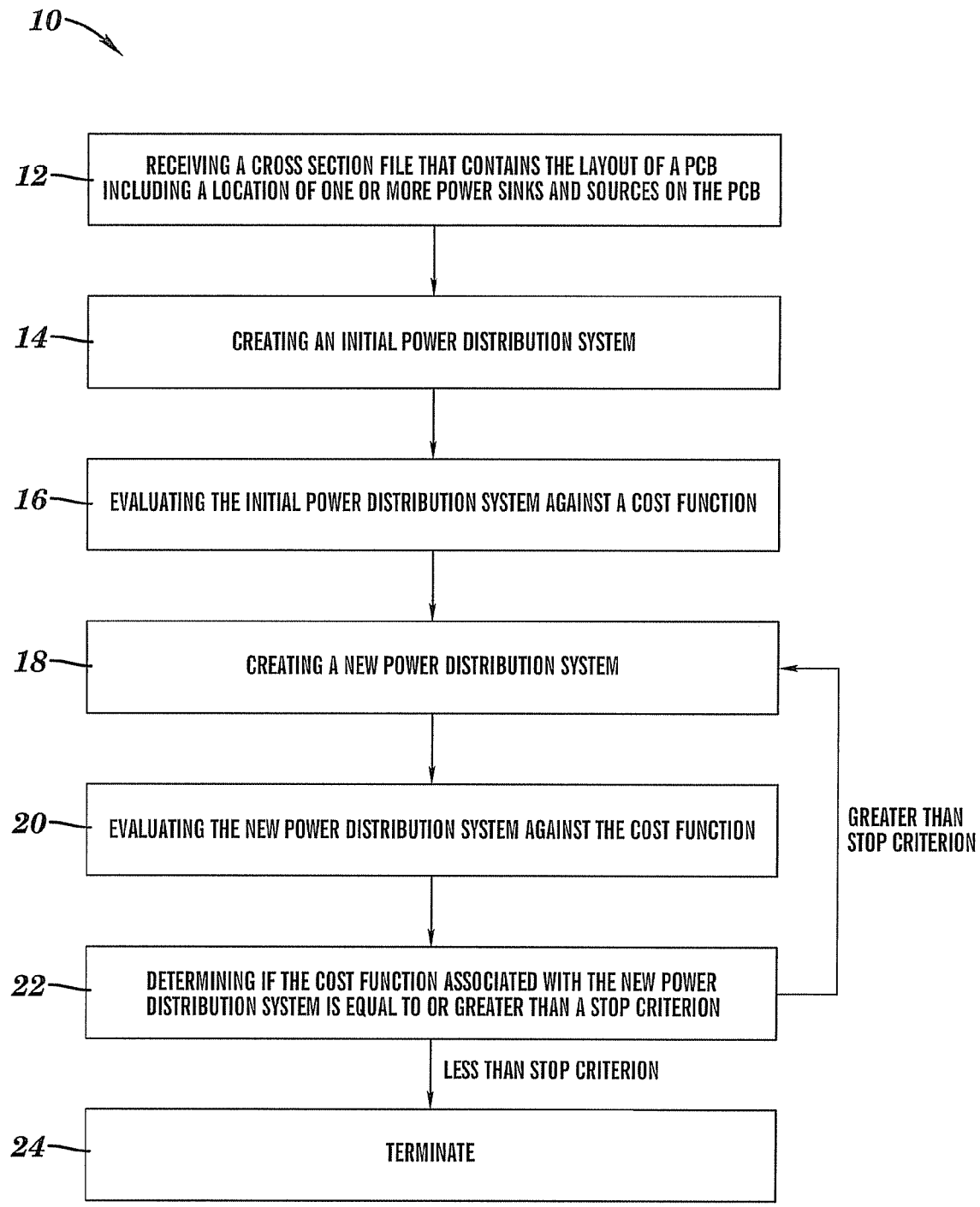
FIG. 1 illustrates a flow chart of an exemplary method for designing a power distribution system in a PCB.

Referring now to FIG. 1, a flow chart of an exemplary method for designing a power distribution system in a PCB is depicted generally as 10. The first step of the method 10 is to receive a cross section file that contains the layout of the PCB including the location of power sinks and sources on the PCB, as depicted at process block 12. After receiving the cross section file, the method 10 includes creating an initial power distribution system, as shown at process block 14. In one embodiment, the initial power distribution system may be any simple power distribution scheme that includes the necessary connectivity between the power sources and power sinks. Alternatively, a standard initial power distribution system that does not include the required connectivity may also be used. The method 10 also includes evaluating the initial power distribution system against a cost function, as shown at process block 16. The cost function can be any function that is used to evaluate the performance of the power distribution system and may include voltage drops on the PCB, voltage gradients, power dissipation, connectivity, or any combination of the foregoing. The cost-function also may also represent other criterions related to be signal integrity issues, power density in the board, current balancing in the connector, power plane resonances, radiation, manufacturing costs, and the like.

After evaluating the initial power distribution system, the method 10 includes creating a new power distribution system, which is a variation on the initial power distribution system (e.g., by reassigning a portion of the PCB power distribution system from one power domain to another), as shown at process block 18. After the new power distribution system is created, the method 10 includes evaluating the new power distribution system against the cost function, as shown at process block 20. At process block 22, the method determines if the cost function is greater than or equal to a stop criterion. If the cost function of the new power distribution system is equal to or greater than a stop criterion the method 10 terminates, as shown at process block 24. Otherwise the method 10 iterates by returning to process block 18 and creating another new power distribution system.

In one embodiment, the PCB includes multiple layers and the initial power distribution system is to assign each layer of the PCB a voltage level. In other words, each layer would have a consistent voltage level and there would be no split layers, or layers with more than one voltage level. In an alternative embodiment, the initial power distribution system includes a multi-drop power network for each power domain using conventional wiring strategies. In exemplary embodiments, additional requirements or restrictions may be placed on the design of the power distribution for signal integrity and decoupling purposes.

Once the method 10 produces a power distribution system, the power distribution system is evaluated against the cost function. The variables used in evaluating the cost function may be determined through the use of a simulation of the proposed power distribution circuit. In other words, the power distribution circuit is simulated such that the voltage gradients, current density distribution, total power dissipation, and other circuit characteristics can be determined and used to evaluate the cost function. Any simulation method or program, such as SPICE, may be used to simulate the power distribution circuit.

In one embodiment, the method 10 assumes that the PCB layers are segmented into polygon-based shapes (e.g., rectangles, triangles, or other shapes). The method 10, at process step 18, may reassign one or more segment of one or more layers of the PCB from one power domain to another. A wide variety of methods may be used to determine which PCB segments to reassign to each power domain. For example, one method may be to identify the PCB segments with the highest current density and determine if they are located at an edge of a group of segments within the same power domain. If such segments are identified, they are reassigned to enlarge the group of segments within the same power domain. In another example, the re-assignment of segments form one power domain to another may be completely random. One advantage of using a completely random approach is that less obvious solutions may be found.

Referring now to FIGS. 2(a)-(d), a series of PCB boards 100(a)-(d) with varying power distribution systems are depicted. The PCB boards 100(a)-(d) depicted are simplified for the purposes of illustration and contain only 2 power domains, V5 102(a)-(e) and V8 104(a)-(e), on a single plane that has been segmented into a matrix of 17×9 cells. The cost function used in evaluating the power distribution design in the PCB is:

$$\text{cost} = \frac{1}{\sum_{d=1}^{m} w^d} \cdot \sum_{d=1}^{m} \left( \sum_{id=1}^{nd} J_{id}^d \cdot (V_{id}^d / Vnom^d) \right)$$

where $Vnom^d$ is the nominal voltage of each domain, nd is the number of testpoints of interest, Vid is the voltage in each testpoint, Jid is the current at the testpoint, Wd is the current per domain d, and m is the number of domains. It will be appreciated by one of ordinary skill in the art that the cost function can be modified using weighting factors, or exponents to name some of the simple modifications, in order to describe different optimization goals.

Figures 2A, 2B:
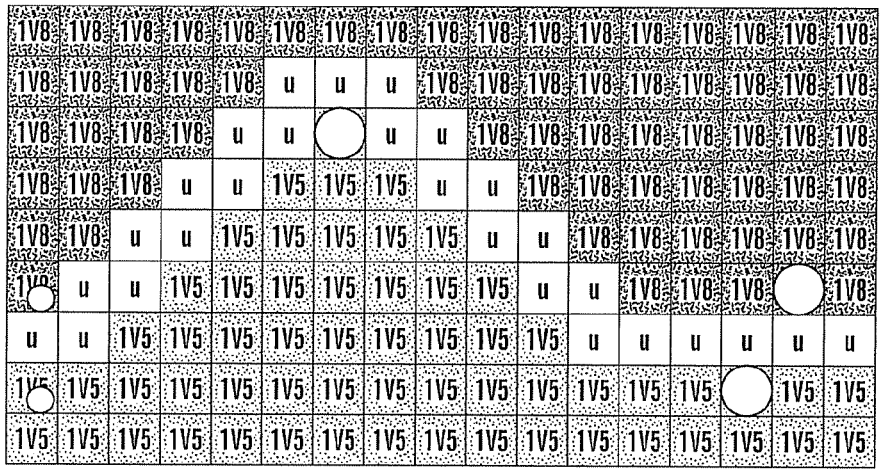
Figures 2C, 2D:
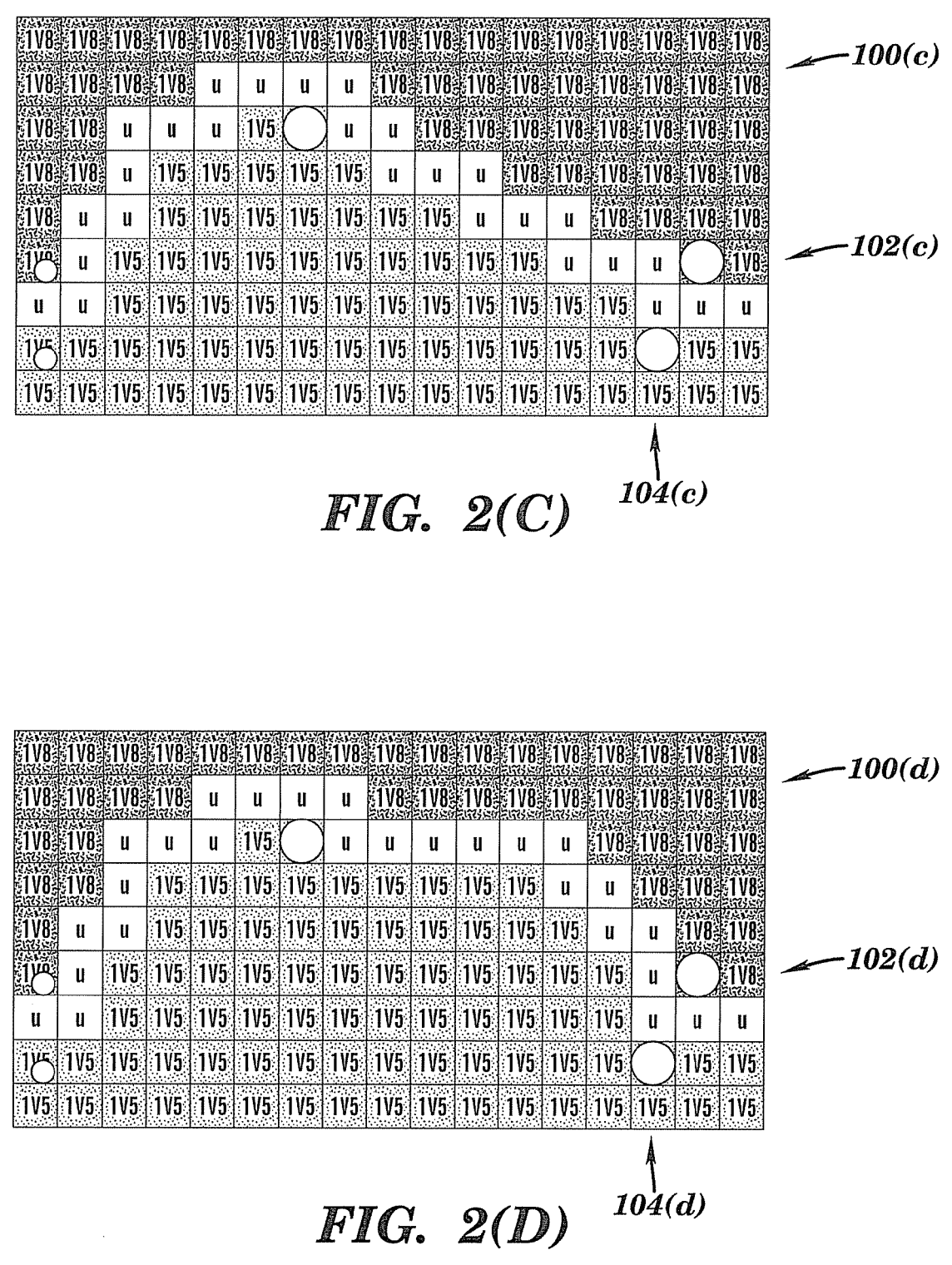

FIG. 2(a) illustrates the PCB board 100(a) including an initial power distribution system that establishes the required connectivity. For example, the power distribution system depicted in FIG. 1 may be a wire making the required connection between the power sinks and sources. The cost function for the power distribution system depicted in FIG. 2(a) is 0.92630. FIG. 2(b) illustrates the PCB board 100(b) including a first iteration of the method for designing a power distribution system. As shown, the power domains V5 102(b) and V8 104(b), of the PCB board 100(b) have been increased in size. As a result, the cost function for the power distribution system depicted in FIG. 2(b) is 0.34048. As shown, the power domains V5 102(c) and V8 104(c), of the PCB board 100(c) have changed slightly in size and shape. As a result, the cost function for the power distribution system depicted in FIG. 2(c) is 0.28678. FIG. 2(d) illustrates the PCB board 100(d) including a third iteration of the method for designing a power distribution system. As shown, the power domains V5 102(d) and V8 104(d), of the PCB board 100(d) have changed slightly in size and shape. As a result, the cost function for the power distribution system depicted in FIG. 2(d) is 0.27100.

The method for designing a power distribution system will continue to iteratively create new power distribution systems until the cost function associated with the power distribution system is less than or equal too a stop criterion. The stop criterion may be specified by a user or may be a function of reduction in cost function between iterations of the method. In other words, the stop criterion may be a percentage reduction in the cost function from the previous power distribution system and the current power distribution system.

FIG. 2(d) illustrates how the two power domains occupy the majority of the PCB board 100(d) with the split in the power domains being adapted to the location of the power sinks and sources. As described above, the size and shape of the segments of the PCB board 100(d) could also be adapted during the method for designing a power distribution system. For example, it would be reasonable to reduce the segment size and restart the method for designing a power distribution system. A reduction in the segment size may result in a smoother split PCB plane configuration. Using non-rectangular grids (e.g. triangular) would give smooth splits as well. It should also be noted that the design of the power distribution system might need to comply with additional requirements, such as signal integrity or manufacturing constraints. In one embodiment, these additional requirements may be taken into account by penalizing the violation of the requirements in the cost function.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for designing a power distribution system, the method comprising:
   receiving a cross section file that contains the layout of a PCB including a location of one or more power sinks and sources on the PCB;
   creating an initial power distribution system, wherein the initial power distribution system includes a required connectivity between the power sinks and sources;
   evaluating the initial power distribution system against a cost function, the cost function including a power dissipation variable, a connectivity variable, and a voltage gradient variable, and represented as:

$$\text{cost} = \frac{1}{\sum_{d=1}^{m} w^d} \cdot \sum_{d=1}^{m} \left( \sum_{id=1}^{nd} J_{id}^d \cdot (V_{id}^d / Vnom^d) \right)$$

where $Vnom^d$ is the nominal voltage of each domain, nd is the number of testpoints of interest, Vid is the voltage in each testpoint, Jid is the current at the testpoint, and Wd is the total current per domain;
   creating a new power distribution system, including modifying a size of a segment of the PCB;
   evaluating the new power distribution system against the cost function;
   determining if the cost function associated with the new power distribution system is equal to or greater than a stop criterion; and
   creating another new power distribution system if the cost function associated with the new power distribution system is greater than the stop criterion.

2. The method of claim 1, wherein the cost function further includes one or more variables corresponding to at least one of the following: signal integrity; power density; current balancing; power plane resonances; radiation; or manufacturing costs.

* * * * *